(12) United States Patent
Ansari et al.

(10) Patent No.: US 11,197,170 B2
(45) Date of Patent: Dec. 7, 2021

(54) CONTROLLING DIRECTIONAL COMMUNICATION EQUIPMENT

(71) Applicant: Telefonaktiebolaget LM Ericsson (publ), Stockholm (SE)

(72) Inventors: Junaid Ansari, Fürth (DE); Gen Li, Beijing (CN)

(73) Assignee: Telefonaktiebolaget LM Ericsson (Publ)

( * ) Notice: Subject to any disclaimer, the term of this patent is extended or adjusted under 35 U.S.C. 154(b) by 376 days.

(21) Appl. No.: 16/321,761

(22) PCT Filed: Aug. 16, 2016

(86) PCT No.: PCT/CN2016/095495
§ 371 (c)(1),
(2) Date: Jan. 29, 2019

(87) PCT Pub. No.: WO2018/032347
PCT Pub. Date: Feb. 22, 2018

(65) Prior Publication Data
US 2019/0182681 A1    Jun. 13, 2019

(51) Int. Cl.
*H04B 7/06*    (2006.01)
*H04B 7/08*    (2006.01)
*H04W 16/28*   (2009.01)
*H04W 74/08*   (2009.01)
*H04B 17/318*  (2015.01)
*H04W 16/14*   (2009.01)

(52) U.S. Cl.
CPC .......... *H04W 16/28* (2013.01); *H04B 7/0617* (2013.01); *H04B 7/0695* (2013.01); *H04B 7/088* (2013.01); *H04B 17/318* (2015.01); *H04W 74/0808* (2013.01); *H04W 16/14* (2013.01)

(58) Field of Classification Search
CPC . H04W 16/28; H04W 74/0808; H04W 16/14; H04B 17/318; H04B 7/0617; H04B 7/0695; H04B 7/088
See application file for complete search history.

(56) References Cited

U.S. PATENT DOCUMENTS

| 8,681,810 B2 | 3/2014 | Nandagopalan et al. |
| 2005/0245237 A1 | 11/2005 | Adachi et al. |
| 2007/0242621 A1* | 10/2007 | Nandagopalan ...... H04L 12/413 370/254 |
| 2007/0268862 A1 | 11/2007 | Singh et al. |

(Continued)

FOREIGN PATENT DOCUMENTS

CN    1499869 A    5/2004

OTHER PUBLICATIONS

European Search Report dated May 31, 2019 for Application No. 16913108.3, consisting of 5-pages.

(Continued)

*Primary Examiner* — Jaison Joseph
(74) *Attorney, Agent, or Firm* — Christopher & Weisberg, P.A.

(57) ABSTRACT

A communication device controls directional communication equipment. In one embodiment, the communication device determines a distance for directionally sensing spectral conditions, and jointly selects an antenna beamwidth and sensing sensitivity with which to directionally sense the spectral conditions based on the distance.

16 Claims, 7 Drawing Sheets

(56) References Cited

U.S. PATENT DOCUMENTS

2015/0245234 A1    8/2015  Roy et al.
2017/0317729 A1*  11/2017  Kobayashi ........... H04B 7/0695

OTHER PUBLICATIONS

BRAN#87; Ericsson L.M—The channel adaptivity and blocking tests; Mar. 21, 2016—Consisting of 8 pages.
F-06921; ETSI EN 301 893 V2.0.0 (Jun. 2015); 5 GHz high performance RLAN; Harmonized Standard covering the essential requirements of article 3.2 of Directive 2014/53/EU; Sophia Antipolis Cedex—France; Consisting of 102 pages.
ETSI TR 103 317; Broadband Radio Access Networks (BRAN); 5 GHz high performance RLAN; Technical Report considering additional mitigation techniques to enable sharing between RLANs and EESS(active) in the 5 350 MHz to 5 470 MHz; [Release Rev 9]; Consisting of 28 pages.
Qureshi, Bilal H. et al. "joint spectrum Sensing and Transmission Using a Sector Antenna in Cognitive Radio Network" The 8th European Conference on Antennas and Propagation (EuCAP 2014), Dec. 31, 2014 (Dec. 31, 2014), abstract, section 1 to 111; Consisting of 5 pages.
R3-161379; Cariou, Laurent et al. "IEEE P802. 11 Wireless LANs" 3GPP TSG RAN WG3 #92, May 27, 2016 (May 27, 2016), pp. 1 to 5; Consisting of 5 pages.
P50749 IVD reference Real time LTE Wi Fi Coexistence Testbed National Instruments—Publication Date: Feb. 16, 2016; Consisting of 12 pages.
International Search Report and Written Opinion dated May 3, 2017, for corresponding International Application No. PCT/CN2016/095495 , International filing date; Aug. 16, 2016; consisting of 6 pages.

* cited by examiner

|  | Antenna beamwidth (α = maximum) | | | | |
|---|---|---|---|---|---|
| Sensing Sensitivity (β = maximum) | α, β | 0.8 α, β | 0.6 α, β | 0.4 α, β | 0.2 α, β |
| | α, 0.8 β | 0.8 α, 0.8 β | 0.6 α, 0.8 β | 0.4 α, 0.8 β | 0.2 α, 0.8 β |
| | α, 0.6 β | 0.8 α, 0.6 β | 0.6 α, 0.6 β | 0.4 α, 0.6 β | 0.2 α, 0.6 β |
| | α, 0.4 β | 0.8 α, 0.4 β | 0.6 α, 0.4 β | 0.4 α, 0.4 β | 0.2 α, 0.4 β |
| | α, 0.2 β | 0.8 α, 0.2 β | 0.6 α, 0.2 β | 0.4 α, 0.2 β | 0.2 α, 0.2 β |

FIG. 2

CONTROLLING DIRECTIONAL COMMUNICATION EQUIPMENT

CROSS-REFERENCE TO RELATED APPLICATIONS

This application is a Submission Under 35 U.S.C. § 371 for U.S. National Stage Patent Application of International Application Number: PCT/CN2016/095495, filed Aug. 16, 2016 entitled "CONTROLLING DIRECTIONAL COMMUNICATION EQUIPMENT," the entirety of which is incorporated herein by reference.

TECHNICAL FIELD

The present disclosure generally relates to controlling directional communication equipment as implemented by a communication device and, more particularly, to jointly selecting an antenna beamwidth and sensing sensitivity with which to directionally sense spectral conditions based on a determined distance for the sensing.

BACKGROUND

There is an increasing demand for spectrum in support of wireless communication. For example, wireless communication devices are becoming more ubiquitous and the data throughput supported by such wireless communication devices has been increasing. Accordingly, spectrum is becoming crowded, thereby increasing the potential for spectral interference and/or reducing the potential for further utilization.

One technique for mitigating or avoiding spectral interference is directional communication. For example, transmit beamforming allows for signals to be transmitted in the direction of a particular remote device, thereby limiting the extent to which those signals interfere with other devices for which the transmission is not intended. Similarly, receive beamforming allows a receiver to be tuned such that signals from a particular direction are received at greater ranges than from other directions, thereby limiting the extent to which devices not in an area of interest interfere with the receiver. Beamforming is often accomplished by controlling the phase and relative amplitude of signals received by, or transmitted from, a plurality of antennas to create at least one lobe of constructive superposition in at least one direction and destructive superposition in other directions. For example, constructive superposition may be used to strengthen signals to and/or from a direction of interest while destructive superposition may be used to weaken signals to and/or from a direction that is not of interest.

Another technique for mitigating or avoiding spectral interference is listen-before-talk (LBT), sometimes alternately referred to as listen-before-transmit. According to an LBT scheme, a device listens for energy in the signaling medium before transmitting. Such a scheme may mitigate or avoid spectral interference by preventing a transmitter from transmitting until the spectrum is relatively clear, or low in utilization.

SUMMARY

The present disclosure generally relates to a communication device that controls directional communication equipment. In particular, the communication device determines a distance for directionally sensing spectral conditions, and jointly selects an antenna beamwidth and sensing sensitivity with which to directionally sense the spectral conditions based on that distance. In particular embodiments, the communication device determines whether or not to transmit based on whether or not the sensed spectral conditions indicate a spectral energy level that is below or above an energy threshold, respectively. Based on a determination of whether or not a transmission from the communication device is successfully received by a particular remote device, the communication device may, in some embodiments, change one or both of the antenna beamwidth and sensing sensitivity. For example, the communication device may select a wider antenna beamwidth responsive to determining that the transmission was not successfully received. As a further example, the communication device may select a less sensitive sensing sensitivity responsive to determining that the transmission was successfully received.

Embodiments of the present disclosure comprise a method of controlling directional communication equipment, implemented by a communication device. The method comprises determining a distance for directionally sensing spectral conditions, and jointly selecting an antenna beamwidth and sensing sensitivity with which to directionally sense the spectral conditions based on the distance.

In some embodiments, the method further comprises determining a carrier frequency in which to directionally sense the spectral conditions. Jointly selecting the antenna beamwidth and sensing sensitivity is further based on the carrier frequency.

In any of these embodiments, jointly selecting the antenna beamwidth and sensing sensitivity may comprise selecting a predefined beamwidth and sensitivity combination from a plurality of predefined beamwidth and sensitivity combinations. For example, the plurality of predefined beamwidth and sensitivity combinations may be one of multiple sets of predefined beamwidth and sensitivity combinations, each set corresponding to a respective carrier frequency.

In any of these embodiments, the method may further comprise directionally sensing the spectral conditions according to the selected antenna beamwidth and sensing sensitivity. For example, directionally sensing the spectral conditions according to the antenna beamwidth and sensing sensitivity may comprise sensing for at least 20 microseconds. Additionally or alternatively, the method may further comprise determining whether or not to transmit based on whether or not the sensed spectral conditions indicate a spectral energy level that is below or above an energy threshold, respectively. In such embodiments, the method may further comprise transmitting in a direction of a remote device responsive to the spectral energy level being below the energy threshold, and changing one or both of the antenna beamwidth and sensing sensitivity based on a determination of whether or not the transmission was successfully received by the remote device. In such embodiments, the method may further comprise waiting for at least a randomly determined duration after determining to transmit before transmitting. Additionally or alternatively, changing one or both of the antenna beamwidth and sensing sensitivity may comprise selecting a wider antenna beamwidth responsive to determining that the transmission was not successfully received by the remote device. Alternatively, changing one or both of the antenna beamwidth and sensing sensitivity may comprise selecting a less sensitive sensing sensitivity responsive to determining that the transmission was successfully received by the remote device. In such an embodiment, selecting the less sensitive sensing sensitivity may be further responsive to the successfully received transmission comprising more than a threshold number of successfully received transmission bursts.

Embodiments herein also include corresponding communication device, computer program, and carrier embodiments.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of a remote device 120, generally, as opposed to discussion of particular instances of remote devices 120a, 120b).

FIG. 2 is a table of example antenna beamwidth and sensing sensitivity combinations, according to embodiments.

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
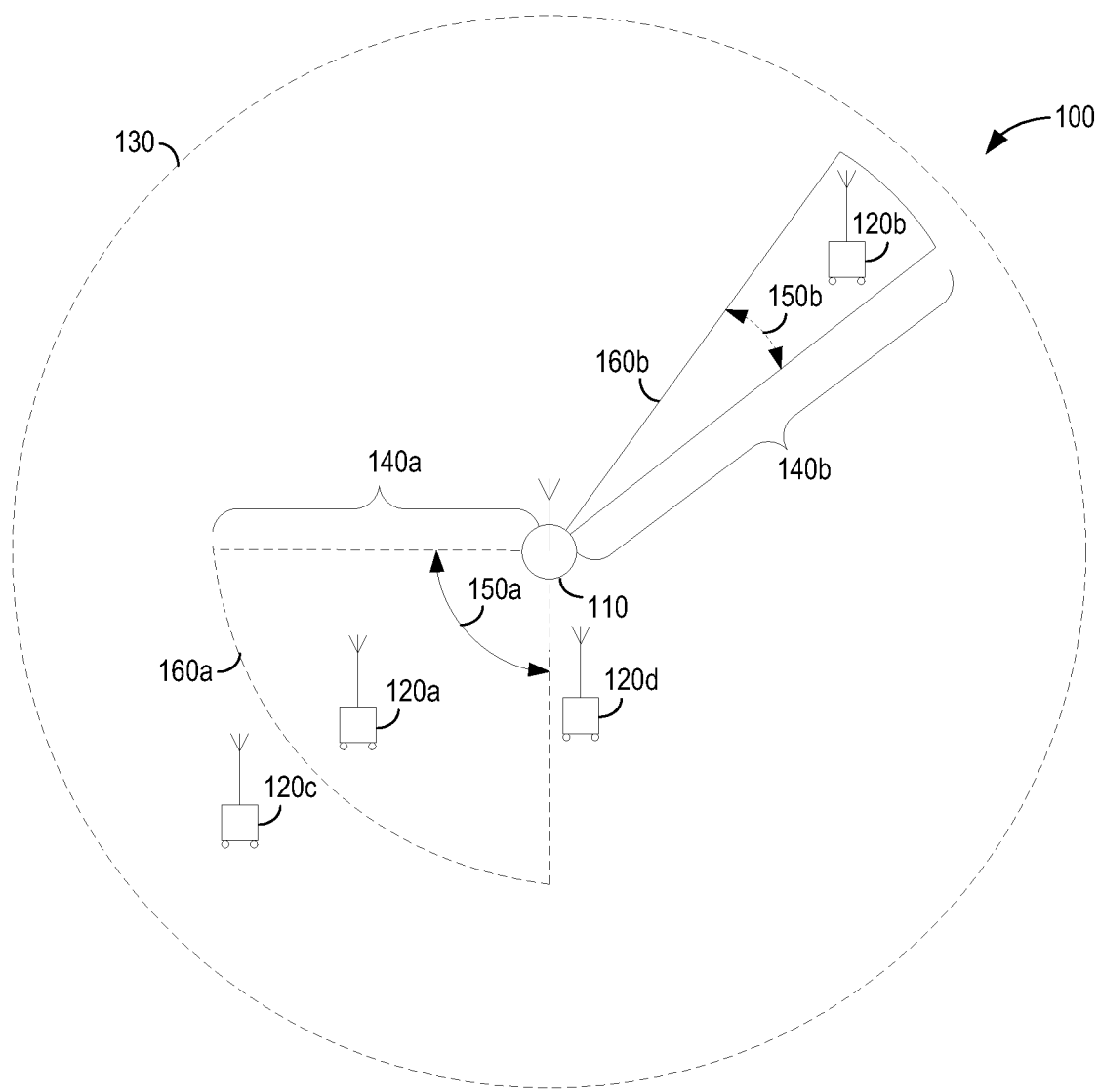
FIG. 1 is a block diagram illustrating an example wireless communication system, according to embodiments.

FIG. 1 illustrates an example wireless communication system 100 that includes a communication device 110 and remote devices 120a-d. The communication device 110 and/or one or more of the remote devices 120a-d may be a radio base station (e.g., an eNodeB, femtocell, Wi-Fi gateway) or mobile device (e.g., a personal computer, laptop computer, desktop computer, workstation, smartphone, tablet computer, wearable computer, smart appliance, acoustic transceiver, radio frequency identification (RFID) tag), for example.

The remote devices 120a-d are within a wireless communication coverage area 130 of the communication device 110. The communication device 110 controls directional communication equipment, e.g., to communicate with one or more of the remote devices 120a-d within the coverage area 130. To do this, the directional communication equipment may be directionally-tuned according to lobes 160a-b, e.g., to transmit and/or receive signals. The directional communication equipment may also be directionally-tuned according to lobes 160a-b to sense spectral conditions (e.g., interference and/or energy in the spectrum) before transmitting, e.g., as part of an LBT scheme.

In the example of FIG. 1, communication device 110 is presently controlling directional communication equipment to sense spectral conditions in the direction of remote device 120b according to lobe 160b, and will subsequently control the directional communication equipment to sense spectral conditions in the direction of remote device 120a according to lobe 160a. The lobes 160a-b are of different dimensions for reasons that will be discussed below. Although only two examples of lobes 160a-b are illustrated in FIG. 1, the communication device 110 may configure one or more other lobes 160 extending in any direction at any time, according to embodiments.

The example lobes 160a-b extend from the communication device 110 for distances 140a-b at antenna beamwidths 150a-b, respectively. According to embodiments, the communication device 110 controls one or more dimensions (e.g., a distance 140) of a lobe 160 by controlling an antenna beamwidth 150 and/or sensing sensitivity of the directional communication equipment. For example, to increase or decrease the distance 140b of a lobe 160b, the communication device 110 may decrease or increase the antenna beamwidth 150b, respectively. An example of this relationship between antenna beamwidth 150 and distance 140 is shown in the example of FIG. 1. According to FIG. 1, the antenna beamwidth 150a of lobe 160a is wider than the antenna beamwidth 150b of lobe 160b. Correspondingly, the distance 140a of lobe 160a is shorter than the distance 140b of lobe 160b.

To further increase or decrease the distance 140 of a lobe 160, the communication device 110 may increase or decrease the sensing sensitivity of the directional communication equipment, respectively. For example, the communication device 110 may increase the sensing sensitivity of the directional communication equipment to increase the distance 140 of a lobe 160 up to the radius of the coverage area 130, in some embodiments. Thus, while increasing the antenna beamwidth 150 may shorten the distance 140 of a corresponding lobe 160, the communication device 110 may, in some embodiments, compensate for this shorter distance 140 by increasing the sensitivity. As will be discussed in greater detail below, the communication device 110 may jointly select antenna beamwidth and sensing sensitivity based on a desired lobe distance 140 in which to transmit signals, receive signals, and/or sense spectral conditions. In this disclosure, jointly selecting a set of items is defined as selecting all of the items in the set as a corresponding combination. Thus, jointly selecting antenna beamwidth and sensing sensitivity is defined as selecting the antenna beamwidth and sensing sensitivity as a corresponding combination.

The communication device 110 may know the locations of remote devices 120a-d, in some embodiments. For example, the communication device 110 may include (or be in communication with) positioning equipment that reports on the positions of the remote devices 120a-d. Thus, the communication device 110 may be aware that, from its perspective, remote device 120c is behind remote device 120a. Further, the communication device 110 may know that, due to the distance 140b of lobe 160b, pointing lobe 160b in the direction of remote device 120a would result in both remote devices 120a, 120c being inside the lobe 160b. Having both remote devices 120a, 120c in the same lobe 160b may result in remote device 120c creating significant interference with sensing measurements performed by the communication device 110 using the lobe 160b. Accordingly, the communication device 110 may control the directional communication equipment such that lobe 160a is used for sensing spectral conditions in the direction of remote device 120a instead of using lobe 160b, i.e., because lobe 160b would include remote device 120a and exclude remote device 120c. To control the directional communication equipment in this way, the communication device 110 may select an appropriate antenna beamwidth 150 and/or sensing sensitivity.

In some scenarios, selecting the antenna beamwidth 150 and sensing sensitivity separately may be problematic. For example, reducing lobe distance 140 solely by changing antenna beamwidth 150 may result in a lobe 160 that is so wide that it includes another interfering remote device 120. For another example, increasing the antenna beamwidth 150a of lobe 160a beyond what is depicted in FIG. 1 may undesirably result in remote device 120d being included in the lobe 160a. Other problems may result if only sensing sensitivity is changed. For example, reducing lobe distance 140 by only changing sensing sensitivity may result in a very narrow lobe 160 that is unable to adequately sense a given remote device 120. Accordingly, embodiments of the present disclosure may jointly select antenna beamwidth 150 and sensing sensitivity for a lobe 160.

In an example, the communication device 110 determines a distance 140a for lobe 160a such that remote device 120a is included and remote device 120c is excluded therefrom. Based on this distance 140a, the communication device 110 jointly selects an antenna beamwidth 150a and sensing sensitivity for lobe 160a. In some embodiments, the determination of the distance 140a and jointly selecting the antenna beamwidth and sensing sensitivity may be to directionally sense spectral conditions before attempting to transmit to remote device 120a, e.g., based on an LBT scheme.

Typically, different carrier frequencies have different signal propagation and/or interference characteristics that may affect the sensing distance 140 of the communication device 110, among other things. Accordingly, some embodiments include determining a carrier frequency in which to directionally sense spectral conditions, and jointly select antenna beamwidth 150 and sensing sensitivity based on this carrier frequency as well as the desired sensing distance 140.

In some embodiments, the jointly selected antenna beamwidth 150 and sensing sensitivity may be a predefined beamwidth and sensitivity combination. FIG. 2 illustrates an example table comprising a plurality of predefined beamwidth and sensitivity combinations from which the communication device 110 jointly selects antenna beamwidth 150 and sensing sensitivity. According to FIG. 2, predefined antenna beamwidth 150 values are represented in terms of a maximum azimuth ($\alpha$) and predefined sensing sensitivity values are represented in terms of a maximum gain ($\beta$). Each of the combinations depicted in FIG. 2 includes an antenna beamwidth 150 value from the set $\{\alpha, 0.8\alpha, 0.6\alpha, 0.4\alpha, 0.2\alpha\}$, from wide to narrow. Each of the combinations depicted in FIG. 2 also includes a sensing sensitivity value from the set $\{\beta, 0.8\beta, 0.6\beta, 0.4\beta, 0.2\beta\}$, from most to least sensitive. Consistent with the example of FIG. 2, jointly selecting antenna beamwidth 150 and sensing sensitivity may include selecting any of these combinations.

Other embodiments may include additional, fewer, or different antenna beamwidth 150 values, sensing sensitivity values, and/or additional, fewer, or different combinations thereof. Further, in some embodiments, the antenna beamwidth 150 values, sensing sensitivity values, and/or combinations thereof (e.g., those shown in FIG. 2) are the result of a numerical equation and/or mathematical expression.

In some embodiments, a given plurality of predefined beamwidth and sensitivity combinations, such as (but not limited to) that illustrated in FIG. 2, may be one of multiple sets of predefined beamwidth and sensitivity combinations, each set corresponding to a respective carrier frequency (or range of frequencies). Thus, in some embodiments, the communication device 110 may determine a carrier frequency in which to directionally sense spectral conditions, and this carrier frequency may be used to identify a particular set of corresponding predefined beamwidth and sensitivity combinations. Similarly, the communication device 110 may determine a range of carrier frequencies in which spectral conditions will be sensed, and identify a set of predefined beamwidth and sensitivity combinations corresponding thereto. Once a set of predefined beamwidth and sensitivity combinations is identified, a particular combination may be selected from the set based on the distance in which the communication device 110 will sense the spectral conditions.

In some embodiments, the communication device 110 may sense spectral conditions for a particular amount of time before transmitting. This may, for example, provide the communication device 110 with adequate time to sample (or otherwise measure) spectral conditions before making a transmission decision. The amount of time in which the communication device 110 senses spectral conditions may be static or dynamic, according to embodiments. The amount of time in which the communication device 110 senses spectral conditions may also be preconfigured or configurable, according to embodiments.

In some embodiments, the amount of time to sense for spectral conditions may be configured to be in compliance with a particular government regulation (e.g., a regulation set by the Federal Communications Commission) and/or standards body (e.g., a standard of the European Telecommunications Standards Institute (ETSI) requiring that devices perform a Clear Channel Assessment (CCA) before transmitting). For example, the communication device 110 may be configured to sense for at least a given duration of time that complies with the provisions of EN 301 893 (e.g., 20 microseconds). For another example, the communication device 110 may sense for at least one Point Coordination Function (PCF) Interframe Space (PIFS) (e.g., 25 microseconds in particular Wi-Fi systems). Other embodiments may sense for other durations of time, including (but not limited to) times as low as 1 microsecond.

In some embodiments, the communication device 110 may determine whether or not to transmit based on whether or not the sensed spectral conditions indicate a spectral energy level that is below or above an energy threshold, respectively. For example, the communication device 110 may transmit in response to Radio Frequency (RF) energy in the spectrum being relatively low (e.g., below the energy threshold). As another example, the communication device 110 may refrain from transmitting in response to RF energy in the spectrum being relatively high (e.g., waiting to transmit until the RF energy sensed in the spectrum falls below the energy threshold).

In addition, in some situations, many devices may be observing the same high-energy conditions and waiting for there to be less energy in the spectrum before transmitting. Once the spectral energy level falls below the energy threshold, there is a potential for two or more of these devices to simultaneously contend for a carrier. In some embodiments, the communication device 110 may attempt to avoid contending with one or more other devices in order to transmit. For example, in some embodiments, after the communication device 110 decides to transmit, the communication device 110 waits for some duration of time before transmitting. This duration of time may be a static or dynamically-determined duration, according to embodiments. For example, the communication device 110 may wait a randomly-determined duration after determining to transmit and before transmitting. Randomly-determining this duration may, in some embodiments, reduce the likelihood that the communication device 110 and another device (e.g., remote device 120a) will both transmit at the same. Other embodiments may wait for a duration that is either configured or preconfigured.

In some embodiments, the communication device 110 determines whether a particular transmission is successfully received. For example, the remote device 120a may respond to transmissions from the communication device 110 with acknowledgements. In one such example, the remote device 120a supports Automatic Repeat reQuest (ARQ) and sends acknowledgements (ACKs) in response to successfully received transmissions, and negative acknowledgements (NACKs) in response to unsuccessfully received transmissions. Further, if the remote device 120a fails to respond to a transmission, the communication device 110 may determine that the transmission was not successfully received (e.g., the transmission was dropped or was not detected by the remote device 120a). Other schemes for determining whether a transmission was successfully received may be applied by the communication device 110.

The communication device 110 may, in some embodiments, change one or both of the antenna beamwidth 150 and sensing sensitivity based on whether or not the transmission was successfully received by the remote device 120a. For example, in response to determining that the transmission was not successfully received by the remote device 120a, the communication device 110 may select a wider antenna beamwidth 150. This wider antenna beamwidth may resolve a problem in which the communication device 110 is not adequately hearing the remote device 120a and/or the spectral conditions affecting the remote device 120a due to lobe 160a being too narrow.

For another example, in response to determining that the transmission was successfully received by the remote device 120a, the communication device 110 may select a less sensitive sensing sensitivity (e.g., by lowering the gain of the directional communication equipment). This less sensitive sensitivity may increase spectral efficiency by causing the communication device 110 to sense less spectral energy and transmit more frequently. In some embodiments, the communication device 110 selects a less sensitive sensing sensitivity when the successfully received transmission comprises more than a threshold number of successfully received transmission bursts. This threshold number of transmission bursts may preconfigured or configured (e.g., by an operator of the communication device 110), according to particular embodiments.

Figure 3:
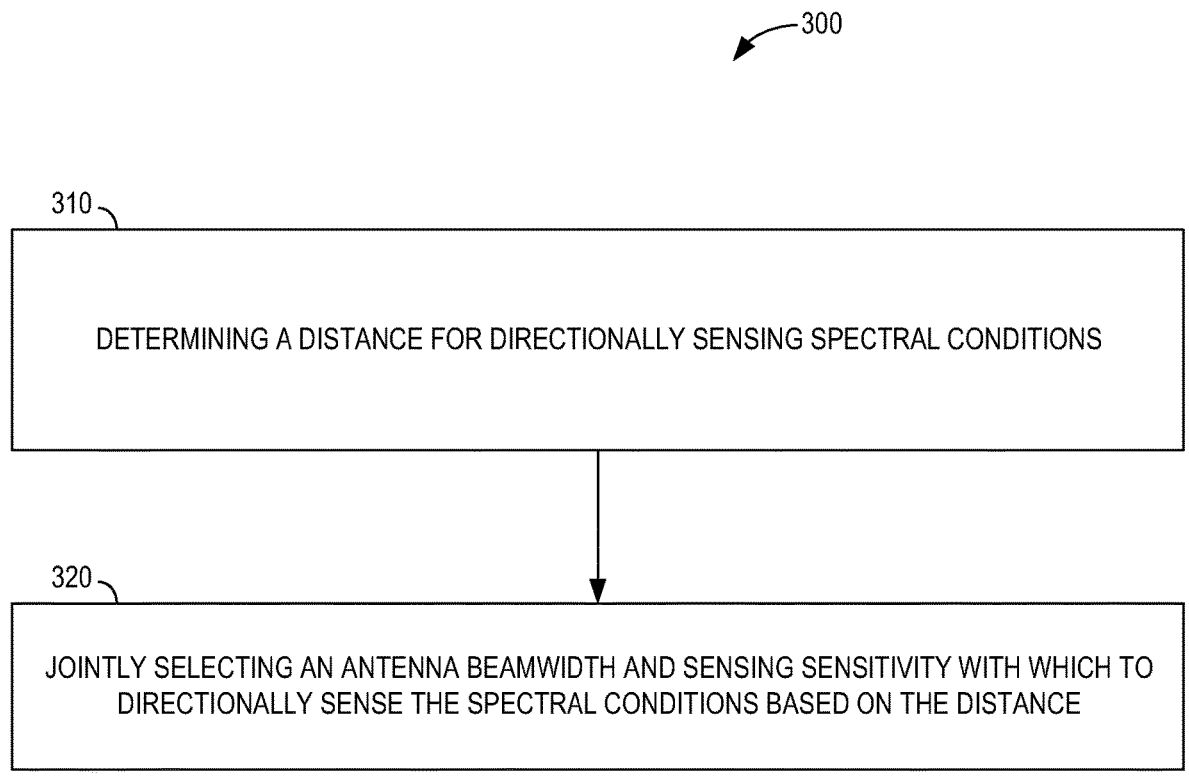
FIG. 3 is a flow diagram illustrating an example method according to embodiments.

In view of the above, FIG. 3 illustrates an example method 300 of controlling directional communication equipment, implemented by a communication device 110. The method 300 comprises determining a distance 140 for directionally sensing spectral conditions (step 310), and jointly selecting an antenna beamwidth 150 and sensing sensitivity with which to directionally sense the spectral conditions based on the distance 140 (step 320).

Figure 4:
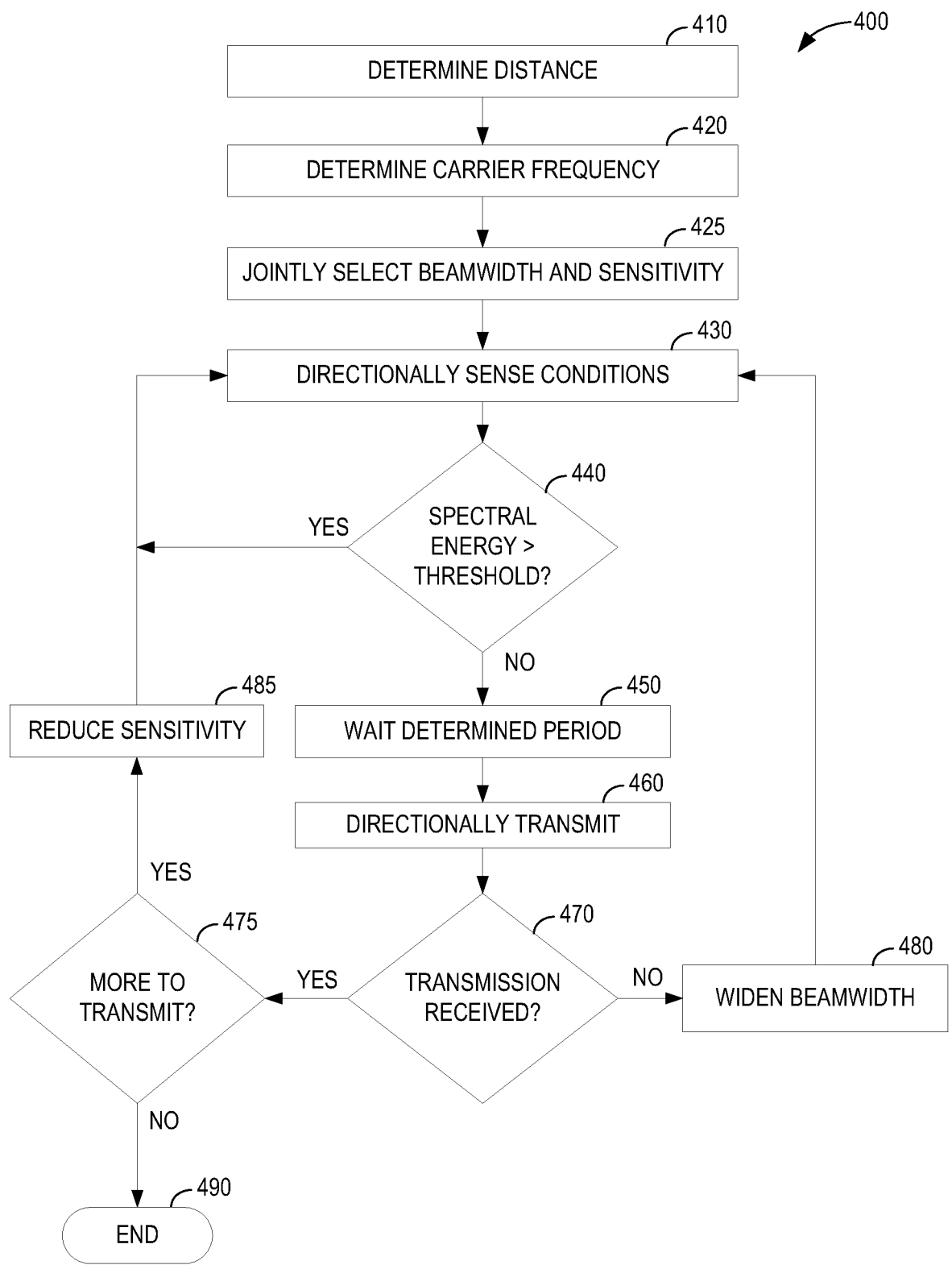
FIG. 4 is a flow diagram illustrating a more detailed example method according to embodiments.

FIG. 4 illustrates a more detailed method 400 of controlling directional communication equipment, implemented by a communication device 110. The method 400 comprises determining a distance 140 (step 410) and a carrier frequency (step 420) for directionally sensing spectral conditions. The method 400 further comprises jointly selecting an antenna beamwidth 150 and sensing sensitivity with which to directionally sense the spectral conditions based on the distance and carrier frequency (step 425). The joint selection of the antenna beamwidth 150 and sensing sensitivity may comprise selecting a predefined beamwidth and sensitivity combination from a set of predefined beamwidth and sensitivity combinations that is predefined for the determined carrier frequency, as discussed above.

The method 400 further comprises directionally sensing the spectral conditions according to the selected antenna beamwidth 150 and sensing sensitivity, e.g., for at least 20 microseconds (step 430). In response to the sensed spectral conditions indicating a spectral energy level that is above an energy threshold (step 440, yes), the communication device 110 returns to directionally sensing spectral conditions (step 430). Alternatively, in response to the sensed spectral conditions indicating a spectral energy level that is below the energy threshold (step 440, no), the communication device 110 waits a determined period of time (step 450) before directionally transmitting, e.g., in one or more transmission bursts as discussed above (step 460).

The method 400 further comprises determining whether or not the transmission was successfully received, e.g., based on one or more acknowledgements received in response to the above-discussed transmission bursts (step 470). In response to the transmission not being successfully received (step 470, no), the communication device 110 selects a wider antenna beamwidth 150 (step 480) and directionally senses spectral conditions using the wider antenna beamwidth (step 430) in preparation for retransmitting (step 460).

In response to the transmission being successfully received (step 470, yes), the computing device 110 determines whether there is more to transmit (step 475). If so (step 475, yes), the communication device 110 selects a lower sensing sensitivity (step 485) and directionally senses spectral conditions using the more sensitive sensitivity (step 430) in preparation for further transmitting (step 460). If not (step 475, no), the method 400 ends (step 490).

Other embodiments of the present disclosure include further methods consistent with either or both of the methods 300, 400 described above, any of which may also include any further techniques described herein.

Figure 5:
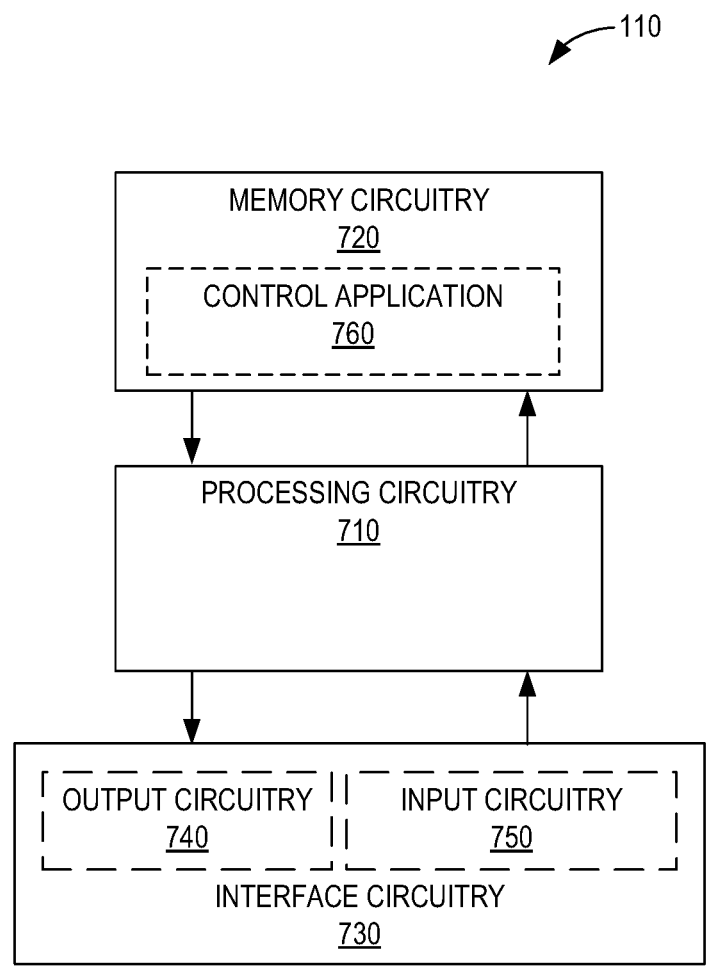
FIG. 5 is a block diagram illustrating example hardware configured according to embodiments.

Yet other embodiments of the present disclosure include the computing device 110 implemented according to the hardware illustrated in FIG. 5. The example hardware of FIG. 5 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing device 110. Such I/O data paths may include data paths for exchanging signals wirelessly with remote devices 120 and data paths for exchanging signals with a user. For example, the interface circuitry 730 may comprise directional communication equipment such as a directional transceiver configured to directionally send and receive wireless communication signals over one or more of a cellular, Wi-Fi, or acoustic network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send wireless communication signals) and input circuitry 750 (e.g., receiver circuitry configured to receive wireless communication signals). Similarly, the output circuitry 740 may comprise a display, whereas the input circuitry 750 may comprise a keyboard. Other examples, permutations, and arrangements of the above and their equivalents will be readily apparent to those of ordinary skill.

According to embodiments of the hardware illustrated in FIG. 5, the interface circuitry 730 is configured to directionally exchange wireless communication signals with a remote device. The processing circuitry 710 is configured to determine a distance 140 for directionally sensing spectral conditions, and jointly select an antenna beamwidth 150 and sensing sensitivity with which to directionally sense the spectral conditions based on the distance 140.

Figure 6:
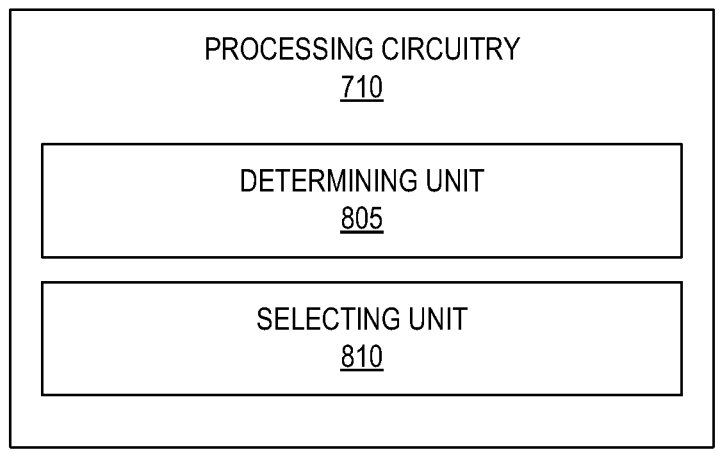
FIG. 6 is a block diagram illustrating a plurality of physical units comprised in processing circuitry of a communication device according to embodiments.

Other embodiments of the present disclosure include the example processing circuitry 710 of the computing device 110 as illustrated in FIG. 6. The processing circuitry 710 comprises a plurality of communicatively coupled physical units. In particular, the processing circuitry 710 comprises a determining unit 805 configured to determine a distance 140 for directionally sensing spectral conditions, and a selecting unit 810 configured to jointly select an antenna beamwidth 150 and sensing sensitivity with which to directionally sense the spectral conditions based on the distance 140.

Figure 7:
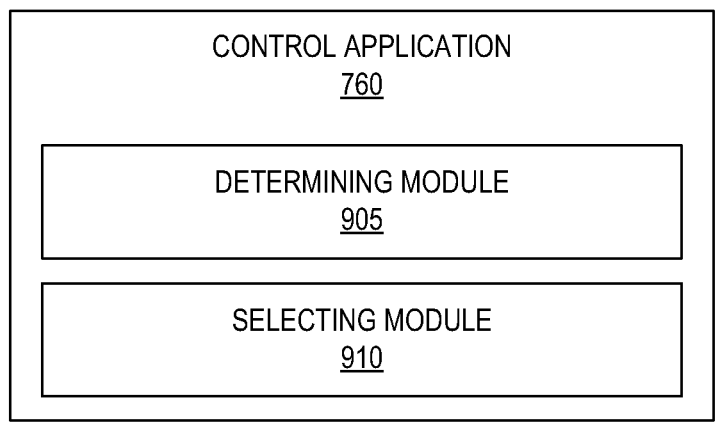
FIG. 7 is a block diagram illustrating a plurality of software modules comprised in control software for controlling a programmable communication device according to embodiments.

Other embodiments of the present disclosure include the example control software 760 of computing device 710, as illustrated in FIG. 7. The control software 760 of FIG. 7 comprises a plurality of software modules. In particular, this control software 760 comprises a determining module 905 configured to determine a distance 140 for directionally sensing spectral conditions, and a selecting module configured to jointly select an antenna beamwidth 150 and sensing sensitivity with which to directionally sense the spectral conditions based on the distance 140.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling directional communication equipment, implemented by a communication device, the method comprising:
    determining a distance for directionally sensing spectral conditions;
    jointly selecting an antenna beamwidth and sensing sensitivity with which to directionally sense the spectral conditions based on the distance; and
    directionally sensing the spectral conditions according to the selected antenna beamwidth for at least 20 microseconds and sensing sensitivity for at least 20 microseconds.

2. The method of claim 1, further comprising determining a carrier frequency in which to directionally sense the spectral conditions, wherein jointly selecting the antenna beamwidth and sensing sensitivity is further based on the carrier frequency.

3. The method of claim 1, wherein jointly selecting the antenna beamwidth and sensing sensitivity comprises selecting a predefined beamwidth and sensitivity combination from a plurality of predefined beamwidth and sensitivity combinations.

4. The method of claim 3, wherein the plurality of predefined beamwidth and sensitivity combinations is one of multiple sets of predefined beamwidth and sensitivity combinations, each set corresponding to a respective carrier frequency.

5. The method of claim 1, further comprising determining whether or not to transmit based on whether or not the sensed spectral conditions indicate a spectral energy level that is below or above an energy threshold, respectively.

6. The method of claim 5, further comprising:
    transmitting in a direction of a remote device responsive to the spectral energy level being below the energy threshold; and
    changing at least one of the selected antenna beamwidth and sensing sensitivity based on a determination of whether or not the transmission was successfully received by the remote device.

7. The method of claim 6, further comprising waiting for at least a randomly determined duration after determining to transmit before transmitting.

8. The method of claim 6, wherein changing at least one of the selected antenna beamwidth and sensing sensitivity comprises selecting a wider antenna beamwidth responsive to determining that the transmission was not successfully received by the remote device.

9. The method of claim 6, wherein changing at least one of the selected antenna beamwidth and sensing sensitivity comprises selecting a less sensitive sensing sensitivity responsive to determining that the transmission was successfully received by the remote device.

10. The method of claim 9, wherein selecting the less sensitive sensing sensitivity is further responsive to the successfully received transmission comprising more than a threshold number of successfully received transmission bursts.

11. A communication device for controlling directional communication, the communication device comprising:
a processor and a memory, the memory containing instructions executable by the processor to configure the communication device to:
determine a distance for directionally sensing spectral conditions;
jointly select an antenna beamwidth and sensing sensitivity with which to directionally sense the spectral conditions based on the distance; and
directionally sense the spectral conditions according to the selected antenna beamwidth for at least 20 microseconds and sensing sensitivity for at least 20 microseconds.

12. The communication device of claim 11, wherein the memory contains further instructions executable by the processor to configure the communication device to determine a carrier frequency in which to directionally sense the spectral conditions, wherein jointly selecting the antenna beamwidth and sensing sensitivity is further based on the carrier frequency.

13. The communication device of claim 11, wherein jointly selecting the antenna beamwidth and sensing sensitivity comprises selecting a predefined beamwidth and sensitivity combination from a plurality of predefined beamwidth and sensitivity combinations.

14. The communication device of claim 13, wherein the plurality of predefined beamwidth and sensitivity combinations is one of multiple sets of predefined beamwidth and sensitivity combinations, each set corresponding to a respective carrier frequency.

15. The communication device of claim 11, wherein the memory contains further instructions executable by the processor to configure the communication device to determine whether or not to transmit based on whether or not the sensed spectral conditions indicate a spectral energy level that is below or above an energy threshold, respectively.

16. A non-transitory computer storage medium storing an executable computer program, comprising instructions which, when executed on at least one processor of a communication device, cause the at least one processor to:
determine a distance for directionally sensing spectral conditions;
jointly select an antenna beamwidth and sensing sensitivity with which to directionally sense the spectral conditions based on the distance; and
directionally sense the spectral conditions according to the selected antenna beamwidth for at least 20 microseconds and sensing sensitivity for at least 20 microseconds.

* * * * *